(12) United States Patent
Speck et al.

(10) Patent No.: US 11,119,067 B2
(45) Date of Patent: Sep. 14, 2021

(54) GLASS ELECTRODE

(71) Applicant: Endress+Hauser Conducta GmbH+Co. KG, Gerlingen (DE)

(72) Inventors: Matthaeus Speck, Goepfersdorf (DE); Thomas Wilhelm, Chemnitz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 357 days.

(21) Appl. No.: 16/225,502

(22) Filed: Dec. 19, 2018

(65) Prior Publication Data

US 2019/0187091 A1 Jun. 20, 2019

(30) Foreign Application Priority Data

Dec. 19, 2017 (DE) ...................... 10 2017 130 514.9

(51) Int. Cl.
*G01N 27/36* (2006.01)
*G01N 27/30* (2006.01)
*G01N 27/333* (2006.01)
*G01N 27/416* (2006.01)

(52) U.S. Cl.
CPC ............ *G01N 27/36* (2013.01); *G01N 27/301* (2013.01); *G01N 27/302* (2013.01); *G01N 27/308* (2013.01); *G01N 27/333* (2013.01); *G01N 27/4167* (2013.01)

(58) Field of Classification Search
CPC ..... G01N 27/301; G01N 27/302; G01N 27/36
See application file for complete search history.

(56) References Cited

U.S. PATENT DOCUMENTS

| 3,923,625 A | 12/1975 | Fischer et al. | |
|---|---|---|---|
| 3,933,612 A | 1/1976 | Fischer et al. | |
| 2014/0158536 A1* | 6/2014 | Thompson | G01N 27/333 204/406 |
| 2015/0053576 A1* | 2/2015 | Pechstein | G01N 27/302 205/787.5 |
| 2017/0160228 A1* | 6/2017 | Pechstein | G01N 27/333 |

FOREIGN PATENT DOCUMENTS

| CN | 2388919 Y | 7/2000 | |
|---|---|---|---|
| CN | 101620199 A * | 1/2006 | ........... G01N 27/403 |
| CN | 104422720 A | 3/2015 | |
| CN | 105823814 A | 8/2016 | |
| DE | 3240239 A1 | 5/1983 | |

(Continued)

OTHER PUBLICATIONS

EPO computer-generated English language translation of the Description section of DE 10327903 A1, patent published Jan. 5, 2005, downloaded Feb. 4, 2021 (Year: 2005).*

(Continued)

*Primary Examiner* — Alexander S Noguerola
(74) *Attorney, Agent, or Firm* — Kelly J. Smith; Endress+Hauser (USA) Holding Inc.

(57) ABSTRACT

The present disclosure relates to a glass electrode including an analyte-sensitive glass membrane, an electrically conductive lead, and an intermediate layer which conductively connects the lead and the glass membrane to one another. According to the present disclosure, the intermediate layer is made of an electron- and/or ion-conducting polymer.

27 Claims, 4 Drawing Sheets

(56) References Cited

FOREIGN PATENT DOCUMENTS

| DE | 10230194 A1 | | 3/2004 | |
|---|---|---|---|---|
| DE | 10327903 A1 | * | 1/2005 | ........... G01N 27/403 |
| EP | 0382846 A1 | | 8/1990 | |
| JP | S6197332 A | | 5/1986 | |
| WO | 9001161 A1 | | 2/1990 | |

OTHER PUBLICATIONS

EPO computer-generated English language translation, patent published Jan. 6, 2006, downloaed Feb. 4, 2021 (Year: 2006).*
Kaden et al., "Polypyrrole as the Active Material for Potentiometric Sensors," Chem. Eng. Technol. 24 (2001) 11 (Year: 2001).*
Kaden et al., "Study of the glass/polypyrrole interface in an all-solid-state pH sensor," Solid State Ionics 169 (2004) 129-133 (Year: 2004).*
Vonau, W., Gabel, J. and Jahn, H., Potentiometric all solid-state pH glass sensors, Elsevier, Electrochimica Acta 50, 2005, 4981-4987.

* cited by examiner

GLASS ELECTRODE

CROSS-REFERENCE TO RELATED APPLICATION

The present application is related to and claims the priority benefit of German Patent Application No. 10 2017 130 514.9, filed on Dec. 19, 2017, the entire contents of which are incorporated herein by reference.

TECHNICAL FIELD

The present disclosure relates to a glass electrode comprising a pH-sensitive glass membrane, a potentiometric sensor, and a measuring arrangement having at least three glass electrodes.

BACKGROUND

Glass electrodes for the measurement of measured variables that represent an activity or concentration of a certain analyte, for example for pH measurement, are used in many areas of industrial analysis metrology or in process analysis, in environmental metrology and in the laboratory. Such glass electrodes can be used, for example, in potentiometric pH measuring chains in order to detect the pH value of a process medium. They can also be used in potentiometric sensors for $CO_2$ measurement, so-called Severinghouse sensors, in which $CO_2$ comes from the measuring medium into an electrolyte-filled measuring chamber separated from the measuring medium by a membrane. The $CO_2$ content of the measuring medium can be determined by detecting the pH value present in the measuring chamber via a glass electrode.

SUMMARY

In the vast majority of cases in which glass electrodes are used, they are used for pH measurement. Therefore, the object on which the present disclosure is based is explained below in reference to the measurement of the pH value of a measuring fluid. However, the same problem is also posed in the other uses of glass electrodes, and the present disclosure described below is not limited to just glass electrodes for pH measurement but may correspondingly be used in other sensors, for example Severinghouse sensors.

Glass electrodes for pH measurement frequently have a housing in which an interior space sealed at one end by a pH-sensitive glass membrane is formed. An internal electrolyte which comprises a pH buffer system and which is therefore also referred to as an internal buffer is accommodated in this interior space in most glass electrodes. The rear surface of the glass membrane facing the housing chamber thus contacts the internal buffer. With its front face that faces away from the interior space, the glass membrane is brought into contact with a measuring fluid. In contact with the measuring fluid, the glass membrane forms a hydrated layer. In this situation, alkali ions of the glass are replaced by protons from the measuring fluid, so that a plurality of hydroxyl groups are formed in the hydrated layer at the interface between the membrane glass and the measuring fluid. In measuring mode of the glass electrode, this is done both on the rear surface contacting the internal buffer and on the outer surface of the membrane that contacts the measuring fluid. Depending on the pH value of the measuring fluid, protons diffuse either from the hydrated layer or into the hydrated layer. Since the internal buffer has a constant pH value, a potential difference that is a function of the pH value of the measuring fluid is thus produced between the inner and outer surfaces of the membrane.

The internal electrolyte is contacted by a lead which is configured, for example, as a metal wire, frequently as a silver chloride wire. At the lead, an electrode potential of the glass electrode can be tapped with reference to a stable reference potential independent of the pH value. For this purpose, measuring chains for potentiometric pH measurement include, in addition to the glass electrode, a reference electrode providing a stable reference potential independent of the pH. This reference electrode can be designed as a conventional silver/silver chloride electrode, for example. The dependence of the electrode potential of the glass electrode with respect to the change in the pH value of a measuring fluid contacting the glass membrane that causes the former change is called the sensitivity of the glass electrode. The electrode potential and the measuring chain voltage detectable between the reference electrode and the lead of the glass electrode can be described as a function of the pH value. Such a function, which represents the electrode potential or the measuring chain voltage as a function of the pH value, is also referred to as a characteristic curve of the glass electrode or as a sensor characteristic curve. This characteristic curve can be described with good approximation as a linear function at least in sections, i.e. over a partial range of the pH scale. This linear function may include a zero point and a slope. The slope is thus a measure for the sensitivity of the glass electrode or of the potentiometric sensor. Based on the characteristic curve, a pH value of the measuring fluid contacting the glass electrode can be assigned to the electrode potential of the glass electrode or to the measuring chain voltage.

The voltage which can be measured between a lead of the glass electrode immersed in the internal buffer and a lead of the reference electrode, inter alia depending on the potential difference across the membrane, is thus a measure for the pH value of the measuring fluid. The lead of the glass electrode and the reference electrode are in many cases designed as metallic conductors with a coating of a low-solubility halide salt, for example as silver wires coated with silver chloride.

The production of such glass electrodes and measuring chains is relatively complex and expensive. Thus, the leak-tight and firmly bonded attachment of the glass membrane to the housing of the electrode and the introduction of an internal buffer and a lead is a complex process which is frequently still performed manually. In addition, the glass membrane usually constitutes a mechanical weak point. A further problem is posed by corrosion processes or aging phenomena of the sensitive glass membrane occurring on the leads immersed in the internal buffer due to glass corrosion or other chemical reactions and/or material transport processes at the interface between the glass membrane and the internal buffer. These factors may limit the service life of the glass electrodes.

It has long been attempted to improve the design of glass electrodes with the goal of saving costs, simplifying manufacture, and maintaining a greater robustness and longer service life of sensors having pH glass electrodes.

One approach that has been picked up again and again is the use of a solid lead that manages to work without an internal buffer contacting the membrane. Some of the approaches in this respect are described in the textbook H. Galster, "pH-Messung—Grundlagen, Methoden, Anwendungen, Geräte" [pH Measurement—Fundamentals, Methods, Applications, Devices], VCH Verlagsgesellschaft mbH, Weinheim, 1990, pp. 135-136.

For example, it was attempted to provide the rear side of the glass membrane facing away from the measuring fluid with a chemically deposited silver coating and to reinforce it galvanically. The metal does not have a firm bond with the glass but "floats" only on the depletion layer of the glass membrane; therefore, these electrodes do not have a long service life and could not be used practically. Another approach is to contact the glass by etching, whereby silver and fluoride ions are incorporated into the glass, so that there is a firm connection to a silver conductive lacquer intermediate layer which is applied to this reaction zone and which in turn is contacted by a copper wire.

In the aforementioned textbook, tests are also described in which the pH-sensitive glass is applied to an electrically conductive solid, which was intended to improve the mechanical stability on the one hand and to act as a solid lead on the other hand. However, these approaches have likewise not proven successful in practice.

The object of the present disclosure is therefore to specify a glass electrode which is relatively simple and inexpensive to manufacture and is robust and durable in use.

The glass electrode of the present disclosure includes an analyte-sensitive glass membrane, an electrically conductive lead, and an intermediate layer that connects the lead and the glass membrane to one another in a conductive manner. According to the present disclosure, the intermediate layer is formed from an electron- and/or ion-conducting polymer.

By providing an intermediate layer of an electron- and/or ion-conducting polymer between the glass membrane and the lead, a permanently stable electrical connection between the lead and the glass membrane is ensured. Due to the electron and/or ion conductivity of the polymer, a polarization of the glass membrane and an associated drift of the electrode potential of the glass membrane can be avoided or at least reduced. The combination of the intermediate layer and the lead forms a solid lead, i.e., an internal electrolyte of the glass electrode can be dispensed with. This makes it possible to design a glass electrode or a potentiometric sensor having a glass electrode with a geometry different than the conventional rod-shaped geometry. For example, the entire portion of the glass electrode or the sensor that is to be brought into contact with the measuring fluid can be given a flat configuration, e.g., in the form of a sensor wafer or a sensor chip. The lead can advantageously have a contact point or be electrically conductively connectable to a contact point. Via the lead or the contact point, a potential of the glass electrode with respect to a reference potential can be tapped, for example by means of a measuring or sensor circuit.

The polymer intermediate layer is easily applied to the glass membrane and can thereby be firmly bonded to the glass membrane. Conventional techniques, such as spin coating, spraying, printing or knife coating, can be used and are easily controlled and automated. This improves production, particularly in comparison to the conventional glass electrodes with liquid internal buffer. Since the glass electrode according to the present disclosure, unlike the glass electrodes with solid lead known from the prior art, does not have a metal lead in contact with the glass membrane over a large area, material and thus, costs, can also be saved. Moreover, the intermediate layer gives the glass membrane increased mechanical stability.

The intermediate layer may be positioned between the lead and the glass membrane. The glass membrane has a front surface specified for contact with a measuring fluid and a rear surface facing away from the front surface. The intermediate layer may cover at least a portion of the rear surface of the glass membrane. The lead can have a surface contacting the intermediate layer at an end facing the glass membrane. For example, the lead may comprise a layer resting on the intermediate layer.

The electron- and/or ion-conducting polymer can be a doped, intrinsically conductive polymer, such as a polymer based on a polythiophene, a polyaniline, a paraphenylene or a polypyrrole. For example, PEDOT:PSS, poly-3,4-ethylenedioxythiophene doped with polystyrene sulfonate, has proven to be advantageous.

The intermediate layer can additionally contain ionic and/or redox-active additives and/or additives capable of charge transfer interactions. Such additives can be, for example, various conducting salts, (polymeric) ionic liquids, prussiates, ferrocene derivatives, derivatives of further metallocenes and other transition metal compounds. These additives can serve to reduce or avoid undesired polarization effects on the glass membrane. As described above, the electrode potential of the glass electrode measured with respect to a reference potential can be described approximately as a linear function of the pH, also referred to as the characteristic curve of the glass electrode. Ionic and/or redox-active additives or additives capable of charge transfer interactions in the intermediate layer can affect the zero point of the characteristic curve of the glass electrode. Furthermore, the zero point of the characteristic curve of the glass electrode can be specifically adjusted by electrochemical variation of the redox state of the intermediate layer.

In one embodiment, the lead is made of an electrically conductive, non-metallic material. This makes it possible to save on expensive materials traditionally used for leads, such as noble metals, including platinum. The lead may be made, for example, of an electron- and/or ion-conducting polymer, an electrically conductive ceramic or an electrically conductive carbon-based material, such as graphite or glassy carbon. It is possible to form the lead and the intermediate layer from materials of the same or similar composition.

In one embodiment, at least a portion of the lead can be formed from carbon fibers, such as in the form of a carbon thread or a textile made from carbon fibers or threads.

In another embodiment, at least a portion of the lead may be formed from an open porous matrix of a first electrically conductive substance, e.g., a polymer or ceramic matrix, which is at least partially filled with a second electrically conductive substance, so that an interpenetrating network is formed from the two electrically conductive substances, both of which are in contact with the glass membrane. The lead formed in this way as a network may have an electrical contact point or be electrically conductively connected to an electrical contact point at which a measuring circuit can tap an electrode potential of the glass electrode.

The glass electrode may further include a housing containing an interior space sealed by the glass membrane, with the intermediate layer and the lead being disposed in the interior space.

In an alternative embodiment, the glass electrode may have a carrier. The carrier may consist of an electrically insulating ceramic, e.g. a zirconium dioxide ceramic, or an electrically insulating plastic, e.g. made of a circuit board material, wherein the glass membrane, the intermediate layer and the lead are applied as a layer package to the carrier. An electrical conductor track that contacts the lead can be arranged on the carrier. In addition, the carrier can also be made of electrically conductive material, e.g. steel, and directly contact the lead.

The lead can be electrically contacted by a further electrical conductor, such as a non-metallic conductor, that is electrically conductively connectible or connected to a measuring circuit. The measuring circuit may, for example, comprise a sensor circuit of a sensor having the glass electrode.

The present disclosure also relates to a potentiometric sensor for determining a value, such as a pH value, of a measuring fluid, comprising a glass electrode according to any of the previously described embodiments, and further comprising a reference electrode and a measuring circuit which is electrically conductively connected to the glass electrode and the reference electrode and is designed to detect a potential difference between the glass electrode and the reference electrode and to generate a measurement signal representing the detected potential difference.

For the detection of measured values, at least one section of the glass electrode that comprises the glass membrane and at least one section of the reference electrode are intended for direct or indirect contact with a measuring fluid. The measurement signal can be, for example, a measurement voltage detectable between the lead of the glass electrode and the reference electrode.

The reference electrode can be a conventional reference electrode of a second type having a housing in which a reference electrolyte is accommodated that can be brought into electrolytic contact with the measuring fluid via a liquid junction, for example a diaphragm or an opening, arranged in the wall of the housing, and having a reference element immersed in the reference electrolyte. The reference element may be, for example, a metal wire coated with a low-solubility metal halide salt, such as a silver wire coated with silver chloride.

In one embodiment, the reference electrode is also electrolyte free. In this embodiment, the reference electrode includes a polymer membrane provided for contact with the measuring fluid and impregnated with an ion exchanger and/or a conducting salt, an electrically conductive lead, and an intermediate layer that electrically conductively connects the lead and the glass membrane and is made of an electron- and/or ion-conducting polymer.

The intermediate layer of the reference electrode may comprise, for example, halide ions, e.g. chloride ions. The lead can be formed from a silver element, for example a silver body, a silver wire or a silver layer, which has a silver chloride coating at least on a surface which is in contact with the intermediate layer. In this way, a silver/silver chloride reference electrode is formed that manages without a liquid reference electrolyte. The silver/silver chloride reference electrode provides a stable, and in some embodiments, pH-independent, reference potential. Like the glass electrode, it can also have a flat design, and in some embodiments, be in the form of a wafer or a chip.

Thus, in an advantageous embodiment, the glass electrode and the reference electrode, including their leads, may be applied to a carrier, such as a common carrier, in the form of a layer package. As mentioned, the carrier may be formed, for example, from an electrically insulating ceramic, an electrically insulating plastic material or an electrically conductive material.

The measuring circuit, the glass electrode and the reference electrode can be inseparably combined in a measuring probe which can be brought into contact with the measuring fluid. Alternatively, the measuring circuit can be divided into a sensor circuit, which may be combined with the glass electrode and the reference electrode in a measuring probe, and an evaluation circuit, which is connected to the sensor circuit for communication and, where applicable, for energy transmission and is spatially separated from the sensor circuit.

Glass electrodes with a solid lead can be charged or recharged during the measuring process because measurement-signal-dependent currents or measurement-voltage-dependent currents are a few pA flow. The associated polarization of the glass electrode over time can result in a change in the zero point of the sensor characteristic curve. In one embodiment, the measuring circuit can therefore be configured to be shifted intermittently into a regeneration mode between measuring mode phases, for example, and to polarize the glass electrode in a targeted manner in the regeneration mode in order to compensate for the polarization of the glass electrode caused in the measuring mode. For this purpose, the measuring circuit can be designed to apply a voltage between the lead of the glass electrode and a counter electrode for at least a certain period of time, where a current flow effected between the glass electrode and counter electrode passes through the glass membrane and the intermediate layer of the glass electrode. The counter electrode can be the reference electrode. In an alternative embodiment, the sensor can have at least one auxiliary electrode which is electrically connected to the measuring circuit and functions as a counter electrode. The auxiliary electrode can be, for example, a pin, a housing part or a layer of an electrically conductive material.

As an alternative or in addition to a switchability into a regeneration mode, the measuring circuit can advantageously be configured to register measurement signals or measurement voltages detected between the lead and the reference electrode during measuring mode and/or the current intensities flowing through the glass electrode at the measurement voltages detected during measuring mode or the charge flowing through the glass electrode. This registration can be accomplished, for example, by recording individual values, a sum or an integral of the measurement voltages detected in a certain period (measurement voltage integral) or the corresponding current intensities (current load integral) or the charge that flowed through (charge integral).

If a regeneration mode of the measuring circuit is provided, a time point when the measuring circuit is to be put into the regeneration mode may be determined based on the registered measurement voltages, current intensities or charges. In addition, a polarization period and/or a voltage to be applied during the polarization period can be determined for the polarization of the glass electrode to be carried out during the regeneration mode based on the registered measurement voltages, charges or current intensities. In one possible embodiment, the measuring circuit can be designed to determine the polarization period and/or the voltage to be applied.

In an alternative or additional embodiment, the intermediate layer of the glass electrode may comprise redox mediators as additives. These redox mediators can compensate the aforementioned charging or recharging effects to a certain extent. Suitable redox mediators are, for example, prussiates, ferrocene derivatives, derivatives of further metallocenes and other transition metal compounds.

The measuring circuit may further be configured to perform a correction of the detected measurement voltage values on the basis of the registered measurement voltages, charges or current intensities by means of a correction model stored in the measuring circuit, for example as part of an operating program executable by the measuring circuit. The measuring circuit can, for this purpose, be configured to determine, on the basis of the sum or the integral via the measurement voltages, current intensities or charges detected within a certain time period, a correction value for correcting the detected measurement voltage values or the measurement signals of the sensor and to correct the measurement voltage values or measurement signals using this correction value. This correction can be used if no regeneration mode is provided or possible. However, it can also be used in a measuring mode phase between two regeneration phases.

The present disclosure also includes a measuring arrangement having a plurality of glass electrodes that do without a potential-stable silver/silver chloride reference electrode by referencing the plurality of glass electrodes against each other. This measuring arrangement comprises at least a first, a second and a third glass electrode according to one of the previously described embodiments, and a measuring circuit configured to detect an electrode potential of each of the glass electrodes with respect to a common reference potential. The electrode potential of each of the glass electrodes is dependent on a pH value of a measuring fluid contacting the glass membrane, such that each of the glass electrodes respectively has a sensitivity, where the sensitivity of a glass electrode corresponds, in each case, to a change of its electrode potential in relation to a change in the pH value of the measuring fluid causing the former change. The sensitivity of the first glass electrode is different from the sensitivity of the third glass electrode. The electrode potential of the first glass electrode has a first zero point as a function of the pH value of the measuring fluid. The electrode potential of the second glass electrode has a second zero point as a function of the pH value of the measuring fluid. The electrode potential of the third glass electrode has a third zero point as a function of the pH value of the measuring fluid, and the first zero point differs from the second zero point.

The first, the second and the third glass electrodes are preferably designed identically in terms of their structure and their geometry. For example, the glass membrane, the lead and the intermediate layer of the glass electrodes may each be configured as layer packages applied to a carrier, as described further above.

In order to detect the electrode potential of each one of the glass electrodes with respect to the reference potential, the measuring circuit can be designed to detect a voltage between the lead and a reference element, such as a reference electrode. The electrode potential of the first glass electrode is thus detected as voltage between the lead of the first glass electrode and the reference element, the electrode potential of the second glass electrode as voltage between the lead of the second glass electrode and the reference element, and the electrode potential of the third glass electrode as voltage between the lead of the third glass electrode and the reference element.

Since the sensitivity of the first glass electrode differs from the sensitivity of the third glass electrode, the first glass electrode can be referenced against the third glass electrode in order to measure a pH value. For example, the sensitivity of the first glass electrode may be reduced compared to the sensitivity of the third glass electrode. By this referencing of the two glass electrodes with respect to one another, a referencing against a reference electrode with reference potential independent of the pH value is no longer necessary. Thus, a conventional reference electrode with junction can be dispensed with. In addition to referencing the first glass electrode against the third glass electrode, a self-compensation of the measuring arrangement is also made possible with regard to changes in the sensitivity of the glass electrodes, such as the first glass electrode, occurring over the course of the service life of the measuring arrangement because the first zero point differs from the second zero point. This can be achieved, for example, by determining the sensitivity or slope of the first or the second glass electrode simultaneously with the measured value determination.

In one embodiment, the sensitivity of the first glass electrode is therefore equal to the sensitivity of the second glass electrode. In this case, the same sensitivity means a correspondence within the standard manufacturing tolerance, which, according to the current state of the art, is about ±2 mv/pH. Based on the fact that the sensitivity of the first and second glass electrodes can be described by means of a function which is linear over at least a partial region of the pH scale and which has the same slope, a change in the slope assigned to the first glass electrode or the second glass electrode over time can be determined and, if applicable, compensated for under the approximation that the first and second glass electrodes exhibit substantially similar aging behavior under identical measuring conditions. A slope assigned to the first glass electrode can be referenced against a slope assigned to the second glass electrode. This enables a stable and reliable measured value determination over a long period of time.

The sensitivity of the first glass electrode to pH may be reduced, such as when compared to the sensitivity of the third glass electrode. pH-sensitive glass membranes with reduced slope are less common, may have cross sensitivities (e.g. to sodium ions$^+$) and may tend to age more rapidly than the well-known, common glass membranes whose sensitivity can be described by means of a linear function whose slope is close to the theoretical value of 59 mv/pH, such as McInnes glass. Intrinsic referencing is therefore advantageous, such as with regard to a glass electrode with reduced sensitivity.

The third zero point may be either identical to or different from the first or second zero point.

In one embodiment, the measuring arrangement can have at least a fourth glass electrode according to one of the previously described embodiments, the electrode potential of which depends on the pH value of the measuring fluid contacting the glass membrane. The measuring circuit is configured to detect the electrode potential of the fourth glass electrode with respect to the common reference potential. The fourth glass electrode has a sensitivity corresponding to a change of its electrode potential in relation to a change in the pH value of the measuring fluid that is causing the former change, and where the sensitivity of the fourth glass electrode is equal to the sensitivity of the third glass electrode.

In a further development of this embodiment, the electrode potential of the fourth glass electrode can have, as a function of the pH value of the measuring fluid, a fourth zero point different from the second zero point. This embodiment allows changes in the sensitivity of the second or the fourth glass electrode occurring over time to also be determined and, if necessary, compensated for.

A further reduction in the measurement uncertainty is possible if the measuring arrangement has more than four glass electrodes, each comprising a pH-sensitive glass membrane, such as five, six or eight glass electrodes, wherein the corresponding sensitivities of the glass electrodes present in addition to those of the first, second, third and fourth glass electrodes may correspond to or differ from the sensitivity of the first or second glass electrode. In the latter case, it is advantageous if the corresponding sensitivities of the additional glass electrodes are present in pairs in each case.

The first and the fourth zero points and also the second and third zero points or, if the measuring arrangement comprises further additional glass electrodes, additional zero points can in each case correspond in pairs. In a further embodiment, it is also possible for all glass electrodes of the measuring arrangement to have different zero points.

In order to produce a second zero point different from the first zero point, the intermediate layer of the first glass electrode can have a different composition and/or a different redox state than the intermediate layer of the second glass electrode. The redox state of the intermediate layer is understood here to be a redox state of a polymer forming the intermediate layer. The intermediate layer of the second glass electrode may accordingly have a different composition and/or a different redox state than the intermediate layer of the fourth glass electrode. As already described, the variation of the zero point can be realized via targeted (electrochemical) polarization of the intermediate layer, and by using ionic and/or redox-active additives or additives capable of charge transfer interactions.

The intermediate layers of the second and third glass electrodes may have the same compositions and/or a substantially identical redox state in order to ensure that the second and third glass electrodes have matching zero points. Accordingly, the intermediate layers of the first and fourth glass electrodes, if present, may have identical compositions and/or a substantially identical redox state, so that the first and fourth glass electrodes have matching zero points.

The different sensitivities of the first and third glass electrodes can be ensured by the pH-sensitive glass membrane of the first glass electrode having a different composition than the pH-sensitive glass membrane of the third glass electrode. The same applies to the second and the fourth glass electrodes in the embodiment mentioned above having at least four glass electrodes. The pH-sensitive glass membranes of the first and second glass electrodes may have an identical composition, thereby ensuring that the first and second glass electrodes have the same sensitivity. Accordingly, the glass membranes of the third and fourth glass electrodes may have an identical composition.

The different sensitivities of the first or second glass electrode compared to the third glass electrode and possibly the fourth glass electrode can also be ensured in that the third or fourth glass electrode has a traditional pH-sensitive glass membrane with a slope of the electrode characteristic curve in the range of the theoretical sensitivity of 59 mV/pH, for example a McInnes glass or similar, while the pH-sensitive glass membrane of the first or third glass electrode is formed in that a traditional pH-sensitive glass membrane having, for example, the same composition as the pH-sensitive glass membrane of the second and in some cases the fourth glass membrane is modified by a thermal treatment and/or a treatment with a substance changing at least the composition of a surface of the glass membrane in such a way that its sensitivity is reduced after the treatment.

The measuring arrangement can further comprise a reference electrode which is connected conductively to the measuring circuit and is provided for contact with the measuring fluid and which provides the common reference potential. The measuring arrangement is configured in such a way that the pH-sensitive glass membranes of the glass electrodes and the reference electrode can be simultaneously impinged with the measuring fluid.

The reference electrode may be a conventional reference electrode of a second type with junction, such as a silver/silver chloride electrode. In this case, the reference electrode has a housing filled with a reference electrolyte, for example a highly concentrated, 3-molar, potassium chloride solution, into which a reference element, for example a silver chloride wire, is immersed, where in the housing wall is arranged a junction via which the reference electrolyte is in contact with the measuring fluid surrounding the reference electrode.

In a preferred embodiment, the reference electrode is an electrode made of an electrically conductive, or, more specifically, electron-conducting, material, for example a metal electrode, an electrode made of a semiconductor material, or a carbon electrode, for example in the form of a graphite or glassy carbon electrode. The reference electrode may be configured as a pin made of the electrically conductive material, such as metal or carbon, as a housing wall of a housing of the measuring arrangement made of the electrically conductive material or as a coating made of the electrically conductive material, such as a metal coating, on a housing wall of the measuring arrangement. The material of the reference electrode is preferably selected such that it is inert with respect to the measuring fluid, so that its potential is representative of the redox potential of the measuring fluid. The measuring arrangement is designed such that the pH-sensitive glass membranes of the glass electrodes and the reference electrode can be impinged simultaneously with a measuring medium, such as a measuring fluid.

In a compact design, the glass electrodes of the measuring arrangement and the reference electrode can be arranged on a carrier, such as a single common carrier. The carrier can be made of an electrically insulating ceramic material, for example a zirconium dioxide ceramic, or of an electrically insulating plastic, such as a circuit board material. The leads of the glass electrodes and the reference electrode may be applied as electrically conductive metallic conductor tracks on the carrier. The intermediate layer and the glass membrane of the individual glass electrodes can be applied as layer stacks on the leads of the glass electrodes.

Alternatively, the carrier can also be made of a conductive material, e.g., steel, and directly contact the lead.

In an advantageous further development of this embodiment, the measuring circuit can at least in part also be arranged on the carrier, for example on a side of the carrier facing away from the side of the carrier that bears the glass electrodes and the reference electrode.

The measuring circuit may be configured to detect potential differences between the respective electrode potentials of the glass electrodes and the common reference potential and to determine the pH value of the measuring fluid in contact with the glass electrodes based on the detected potential differences. For this purpose, the measuring circuit may be connected to the lead of each of the glass electrodes of the measuring arrangement and to a reference electrode providing the common reference potential. Such a reference electrode providing a common reference potential may also be one of the glass electrodes. The measuring circuit is configured to detect a voltage between the lead of the glass electrode and the reference electrode as a potential difference between the electrode potential of a glass electrode and the common reference potential.

The measuring circuit may be configured to determine a pH measured value based on the electrode potential of the first or second glass electrode detected with reference to the common reference potential and on the basis of the electrode potential of the third or, where applicable, the fourth glass electrode detected with reference to the common reference potential.

The measuring circuit can additionally or alternatively be configured to determine a first slope representing a sensitivity of the first and second glass electrodes based on the potential difference between the electrode potential of the first glass electrode and the reference potential, the potential difference between the electrode potential of the third glass electrode and the reference potential and based on the first and second zero points.

Likewise, in the embodiment with four glass electrodes described above, the measuring circuit can be configured to determine a second slope representing a sensitivity of the third and fourth glass electrodes based on the potential difference between the electrode potential of the second glass electrode and the reference potential, the potential difference between the electrode potential of the fourth glass electrode and the reference potential, and based on the third and fourth zero points.

Optionally, the measuring circuit can be configured to evaluate a temporal course of the ascertained slope or the ascertained slopes in order to determine a state of the measuring arrangement, such as a state of at least one of the glass electrodes. An increasing aging of the associated glass electrode is to be read from the temporal course of the slope. One or more limit values can be predefined, wherein the measuring circuit can output a warning or alarm signal if the slope assigned to a glass electrode falls below the limit value. For example, a first limit value may be set in such a way that a calibration of the measuring arrangement is required when the limit value has fallen below the first limit value. Alternatively or additionally, a second limit value may be set in such a way that a replacement of the associated glass electrode is required when the limit value has fallen below the second limit value.

As described above for the potentiometric sensor, the measuring circuit can be configured to regenerate the individual glass electrodes of the measuring arrangement by applying a voltage between the individual lead electrodes of the glass electrodes and one or more counter electrodes.

If the measuring arrangement is designed in such a way that the common reference potential is provided by a substantially inert reference electrode, for example a metal electrode or a carbon electrode, immersed in the same measuring fluid as the pH-sensitive glass membranes of the glass electrodes, the measuring circuit can be designed to determine the redox potential of the measuring fluid based on the detected potential differences between the electrode potentials and the common reference potential and a determined pH measured value.

The present disclosure also comprises a method for producing a glass electrode according to one of the previously described embodiments. The method comprises steps of applying a layer of an electron- and/or ion-conducting polymer or an electrically conductive ceramic to an analyte-sensitive glass membrane. Connecting a lead made of an electrically conductive material to the side of the applied layer facing away from the glass membrane, so that the layer forms an intermediate layer conductively connecting the glass membrane and the lead to each other.

Connecting the lead to the layer may include applying a layer made of the electrically conductive material by a joining, laminating or coating process.

The present disclosure also includes a method for operating a sensor or a measuring arrangement having at least one glass electrode according to one of the previously described embodiments, wherein the method includes steps of contacting the at least one glass electrode and a reference electrode of the sensor or the measuring arrangement with a measuring fluid, repeatedly detecting a measurement voltage between the at least one glass electrode and a reference electrode of the sensor in a measuring mode of the sensor or the measuring arrangement, and shifting a measuring circuit of the sensor or the measuring arrangement from the measuring mode into a regeneration mode, and applying a voltage between a lead of the at least one glass electrode and a counter electrode during the regeneration mode, where the counter electrode is arranged on a side of a glass membrane of the at least one glass electrode that faces away from the lead.

The method described here and below can be carried out automatically by the measuring circuit of the sensor or of the measuring arrangement. The measuring circuit may, for example, comprise an operating program used to carry out the method and may be configured to execute the operating program. The measurement voltages which are repeatedly detected during the measuring mode are used to determine measured values of the measured variable, e.g. the pH value. As already mentioned, the voltage applied in the regeneration mode can serve to selectively change the redox state of the intermediate layer of the at least one glass electrode in order to set a zero point and/or to compensate for undesired polarization effects. The counter electrode can be a reference electrode of the sensor or the measuring arrangement. The counter electrode can also be an additional auxiliary electrode.

While the measuring circuit applies a voltage between the lead and the counter electrode during the regeneration mode, the counter electrode and the glass electrode can remain in the measuring fluid. Alternatively, before the measuring circuit is shifted into the regeneration mode or simultaneously with the shifting of the measuring circuit into the regeneration mode, the glass electrode and the counter electrode can be brought into contact with a regeneration fluid, so that they are in contact with the regeneration fluid during the application of the voltage between the lead and the counter electrode. This fluid may be an aqueous electrolyte solution, which may contain additives used for cleaning and/or regenerating the glass membrane.

The method can further include steps of registering, during the measuring mode, registering measurement voltages detected within a time period and/or charge or current intensities flowing in a time period between the at least one glass electrode during the measuring mode, and the reference electrode. The method also includes steps of determining a load and or charge or current intensities, and determining a determining a load on the glass electrode based on the registered measurement voltages, charge or current intensities. Based on the determined load, determining a time point at which the measuring circuit is to be put into the regeneration mode and/or, based on the determined load, determining a voltage to be applied during the regeneration mode and/or a time period in which the voltage is to be applied between the lead and the counter electrode in the regeneration mode.

The determined load can be, for example, a sum or an integral of the registered measurement voltages, current intensities or charges. The time point at which the measuring circuit is to be put into the regeneration mode may be determined, for example, by a comparison of the determined load (e.g., one of the aforementioned integrals) with a threshold value. When the threshold value is exceeded, the measuring circuit can output a warning message or a time point at which regeneration is to be carried out. The measuring circuit may also automatically switch into regeneration mode immediately after the threshold value is exceeded and apply the voltage between the lead and the counter electrode. The voltage to be applied and the time during which this voltage is to be applied for regeneration, can be determined based on the registered charges or current intensities or based on a total charge that flowed through the glass electrode and that is calculated from the registered measurement voltages.

The method for operating the sensor or the measuring arrangement may further comprise a correction of the detected measurement voltage values based on the load or the registered measurement voltages, charges or current intensities by means of a correction model stored in the measuring circuit. For example, a sum or an integral of the charge that flowed through the glass electrode can be determined from the registered measurement voltages, charges or current intensities, and from it can be derived a correction value for correcting the detected measurement voltage values or for correcting measurement signals derived from the measurement voltage values. This correction can be used if no regeneration mode is provided or possible. However, it is also advantageous to perform this correction in operating phases during measuring mode between two operating phases in the regeneration mode so as to provide more accurate measured values.

If the measuring arrangement has a plurality of glass electrodes, a voltage can be applied sequentially between each of the leads and the counter electrode during the regeneration mode.

BRIEF DESCRIPTION OF THE DRAWINGS

The present disclosure is explained below in detail with reference to the exemplary embodiments shown in the figures. Shown are.

DETAILED DESCRIPTION

Figure 1:
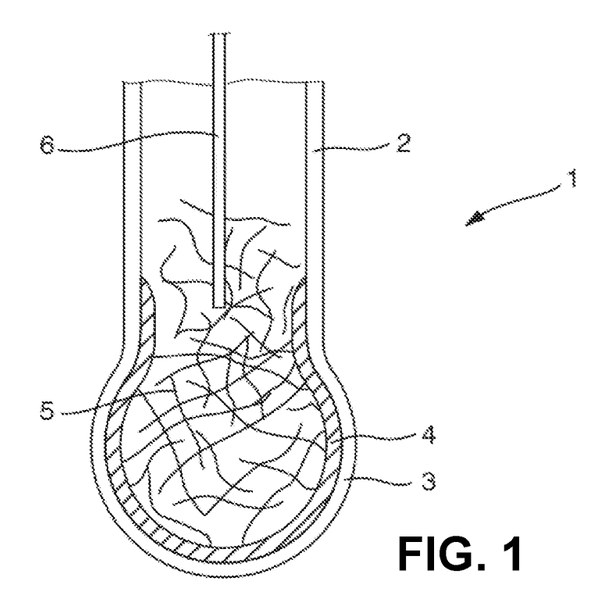
FIG. 1 shows a schematic longitudinal sectional view of a glass electrode with a solid lead.

FIG. 1 shows schematically in a longitudinal sectional view a glass electrode 1 having a shaft-shaped, hollow cylindrical housing 2 and a dome-shaped glass membrane 3 closing the front side of the housing 2. The glass membrane 3 is made of a pH-sensitive glass. It is electrically conductively connected to a lead 5 via an intermediate layer 4. The intermediate layer 4 is formed by a coating of a doped, intrinsically conductive polymer which is applied to the rear side of the glass membrane 3 facing the interior of the housing 2. In the present example, the polymer is PEDOT:PSS. In the present example, the lead 5 is formed from a fabric made of a carbon, i.e., a textile structure formed from electrically conductive carbon fibers by weaving, spinning or twisting. The fibers of the carbon fabric contact the intermediate layer 4 over a large area on its side facing away from the glass membrane 3, so that a potential forming on the glass membrane 3 in contact with the outward facing front side of the glass membrane 3 with a measuring fluid can be tapped against a reference potential via a contact pin 6 that is made of an electrically conductive material, such as a metal, graphite or glassy carbon, and that is in contact with the fabric.

The intermediate layer can be applied by application of polymer preparations, for example an ink or paste, by spraying, printing, knife coating, dip coating or spin coating, and dried in a subsequent drying step. Before, during or after drying, the applied layer can be post-treated, for example, by doping or by an energy-intensive post-treatment, such as annealing or irradiation. Then, it can be contacted by the lead 5 on its side facing away from the glass membrane 3.

The layer-like structure of the glass electrode 1 shown here with the glass membrane 3, the intermediate layer 4 and the lead 5 manages without a liquid internal electrolyte that produces an electrical contact between the glass membrane and the lead. This structure makes it possible to manufacture glass electrodes in many different forms, for example in a rod shape (as shown in FIG. 1) with a circular or else polygonal sectional area, in a ball or partial ball shape, or in a substantially flat shape, e.g., in the form of a wafer or chip.

Figure 2:
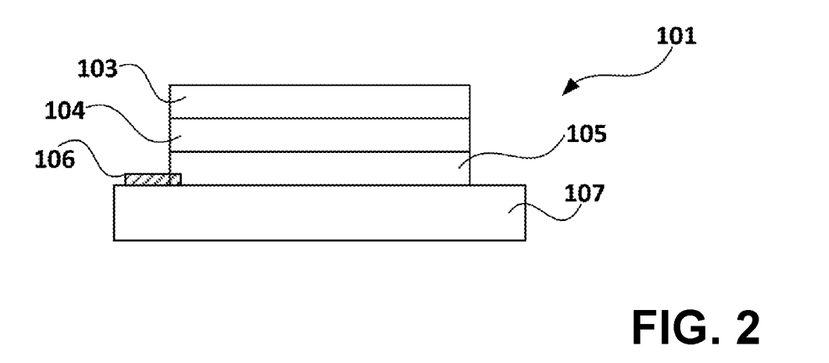
FIG. 2 shows a schematic longitudinal sectional view of a layer structure of a glass electrode with a solid lead.

FIG. 2 schematically shows a longitudinal section through a flat glass electrode 101. It comprises a carrier 107, which can be made of an electrically insulating ceramic, e.g., based on zirconium dioxide, or an electrically insulating plastic. A layer package, the lowest layer of which is directly applied to the carrier 107 and is made of an electronically conductive material, for example a metal such as silver or copper, is applied to the carrier 107. It forms the lead 105 of the glass electrode 101. The lead 105 is contacted by a conductor track 106 that is arranged on the carrier 107 and, for example, made of copper or the same material as the lead 105 and connects the lead 105 to the measuring circuit (not shown).

An intermediate layer 104 of an electronically and/or ionically conductive polymer is applied to the layer forming the lead 105. The intermediate layer 104 may, for example, be formed of an intrinsically conductive doped polymer, for example PEDOT:PSS. For example, in order to reduce polarization effects in measuring mode, it may contain redox-active additives or additives capable of charge transfer interactions, such as prussiates or ferrocenes. The pH sensitive glass membrane 103 is disposed on the intermediate layer 104 so that the intermediate layer 104 electrically conductively connects the rear side of the glass membrane 103 to the lead 105. If a measuring fluid contacts the side of the glass membrane 103 facing away from the carrier 107, a pH-dependent potential arises that can be tapped with respect to a reference potential on the lead 105 via the conductor track 106. Such a flat glass electrode 101 can serve as the basis for the production of a compact and robust pH sensor. The measuring circuit can be arranged on the same carrier 107 as the layer package comprising the lead 105, the intermediate layer 104 and the glass membrane 103.

In a somewhat modified exemplary embodiment, the lead 105 can be contacted on the rear side via a feed-through in the carrier 107. A pin or plug connector electrically conductively connected to the feed-through can be arranged on the opposite side of the carrier 107. In this exemplary embodiment, the measuring circuit can be arranged at least partially on a circuit board. By means of the pin or plug connector, the glass electrode 101 can be interchangeably connected to the carrier 107 via the circuit board and the measuring circuit arranged thereon. In this exemplary embodiment, the glass electrode is thus exchangeable.

Figure 3:
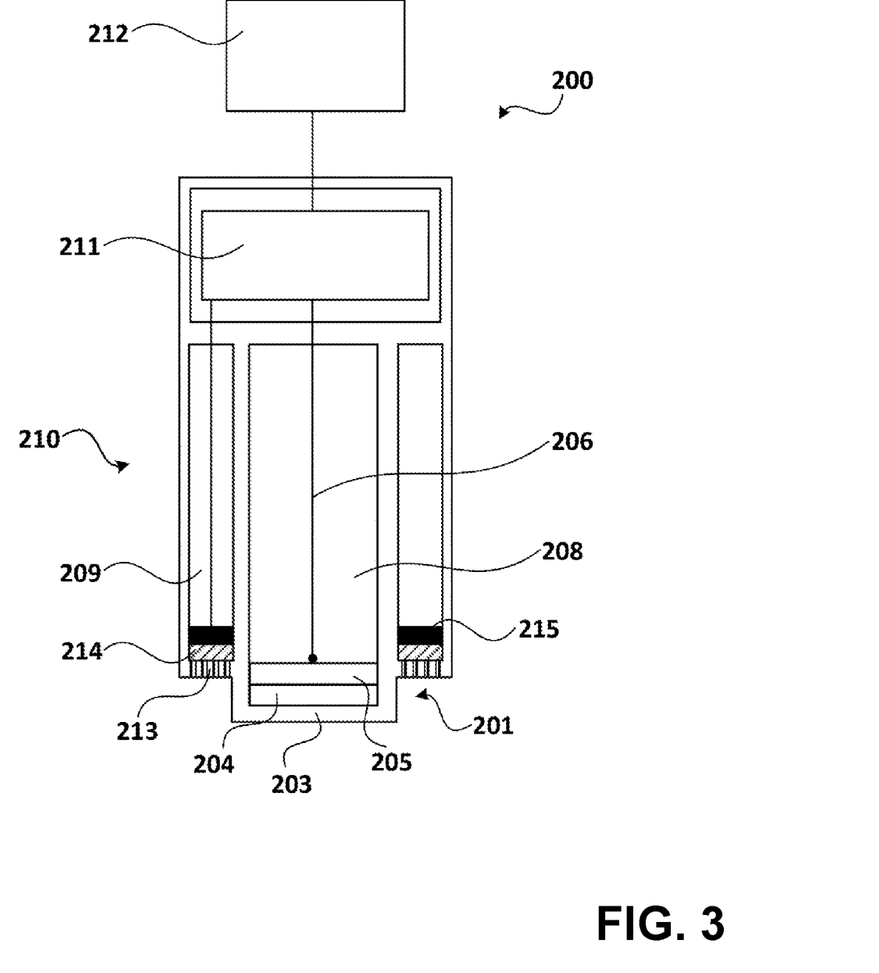
FIG. 3 shows a schematic longitudinal sectional view of a pH sensor having a glass electrode and a reference electrode, each having a solid lead.

FIG. 3 is a schematic longitudinal sectional view of a potentiometric pH sensor 200 having a probe that is formed of a glass electrode 201 and a reference electrode 210 and configured as a single-rod measuring chain and immersible in a measuring fluid, and an evaluation circuit 212 connected to a sensor circuit 211 of the probe. The sensor circuit 211 and evaluation circuit 212 together form a measuring circuit which serves inter alia to detect, process and output pH measured values. The individual parts of the measuring circuit can be suitably divided between the sensor circuit 211 fixedly connected to the probe and the superordinate evaluation circuit 212. The sensor circuit 211 and the evaluation circuit 212 can be detachably interconnected, for example via a plug connector coupling, so that the probe can be replaced, if required, with another structurally identical probe. The evaluation circuit 212 may have an electronic data processing unit with one or more microprocessors, input means, such as switches or buttons, display means, e.g. a display, and an interface to a further superordinate unit, e.g. to a process control. The evaluation circuit 212 can be configured as a measurement transmitter or as another display and operating device, such as a (portable) computer, smartphone or other smart device. The connection between the sensor circuit 211 and the evaluation circuit 212 may also be of wireless design, for example in the form of a radio connection.

The probe comprises a cylindrical housing, which is configured at least on its front end for immersion in a measuring fluid. It can be made of glass, for example. A first chamber 208 is formed in the housing and, at its end intended for immersion in the measuring fluid, is closed by a flat disk-shaped, pH-sensitive glass membrane 203. The glass membrane 203 may be fused to the glass wall of the first chamber 208. An intermediate layer 204 made of an electronically or ionically conductive polymer is arranged in the interior of the chamber 208 on the rear side of the glass membrane 203 facing the chamber 208, and its rear surface facing away from the glass membrane 203, is contacted by an electrically conductive metal layer which functions as a lead 205 of the glass electrode 201. The lead 205 is electrically conductively connected to a metal wire 206, which in turn connects the lead 205 to the sensor circuit 211.

In this exemplary embodiment, the lead 205 may also alternatively be formed by carbon fibers or a carbon fabric that is contacted by the metal conductor 206. The metal conductor 206 can also be configured as a metallic coating applied to the housing wall, e.g., as a conductor track, instead of as a wire.

The reference electrode 210 is formed in a second chamber 209 of the housing of the single-rod measuring chain. It can in principle be formed as a conventional reference electrode of a second type, for example as a silver/silver chloride electrode. In this case, it may have a fluid or non-fluid polymer-thickened reference electrolyte that is contained in the chamber 209 and that contains a high concentration of potassium chloride, and a reference element contacting the reference electrolyte, e. g., silver-chloride-coated silver wire. Furthermore, this reference electrode may comprise a junction, such as in the form of a porous diaphragm, which is arranged in the housing wall of the chamber 209 and via which the reference electrolyte can be brought into contact with the measuring fluid when the front end of the single-rod measuring chain intended for immersion in the measuring fluid is brought into contact with the measuring fluid.

In an advantageous embodiment, as illustrated for example in FIG. 3, the reference electrode 210 is also designed to be free of electrolyte. In the example shown here, it comprises a polymer membrane 213 which closes the second chamber 209 of the probe housing at its front end. The polymer membrane 213 is impregnated with an ion exchanger/polyelectrolyte and/or conducting salt. Suitable for this purpose are fluorinated arylborate conducting salts, polyacrylates, polysulfonates or derivatives of (polymeric) ionic liquids. This polymer membrane 213 extends annularly around the housing wall of the first chamber 208. Arranged on its side facing the second chamber 209 is an intermediate layer 214 that likewise extends annularly around the first chamber 208 and upon which an at least partially metallic layer serving as a lead 215 of the reference electrode 210 is in turn applied. The lead 215 also extends annularly around the housing wall of the first chamber 208. In this way, as large a contact area as possible is provided between the lead 215 and the intermediate layer 214 as well as between the intermediate layer 214 and the polymer membrane 213, so that a good electrical contact between the layers is ensured. The intermediate layer 214 is made of an electron- and/or ion-conducting polymer; for example, it may be formed from the same polymer as the intermediate layer 204 of the glass electrode 201.

The lead 215 may comprise, for example, a layer of metallic silver and a further silver chloride layer disposed between the intermediate layer 214 and the metallic silver layer. On its rear side facing the interior of the second chamber 209, the lead 215 is contacted via an electrical conductor, e.g., a metal wire or a metal layer applied onto the housing wall, and connected by it to the sensor circuit 211.

The measuring circuit is configured to detect as a measurement voltage a voltage arising in contact with the measuring fluid between the lead 214 of the glass electrode 201 and the lead 215 of the reference electrode 210. This measurement voltage, as described in the introduction, is a measure of the pH value of the measuring fluid and is further processed by the measuring circuit as a measurement signal and/or output to a superordinate unit. By means of a sensor characteristic curve which is determined by calibration and stored in a memory of the measuring circuit and which assigns pH values of the measuring fluid to values of the voltage detectable between the leads 205 and 215, the measuring circuit can determine and output a value of the pH value of the measuring fluid based on the detected measurement voltage.

Another very advantageous measuring arrangement for determining a pH value which manages without a reference electrode or with a simple pseudo-reference electrode is described below in reference to FIG. 4.

Figure 4:
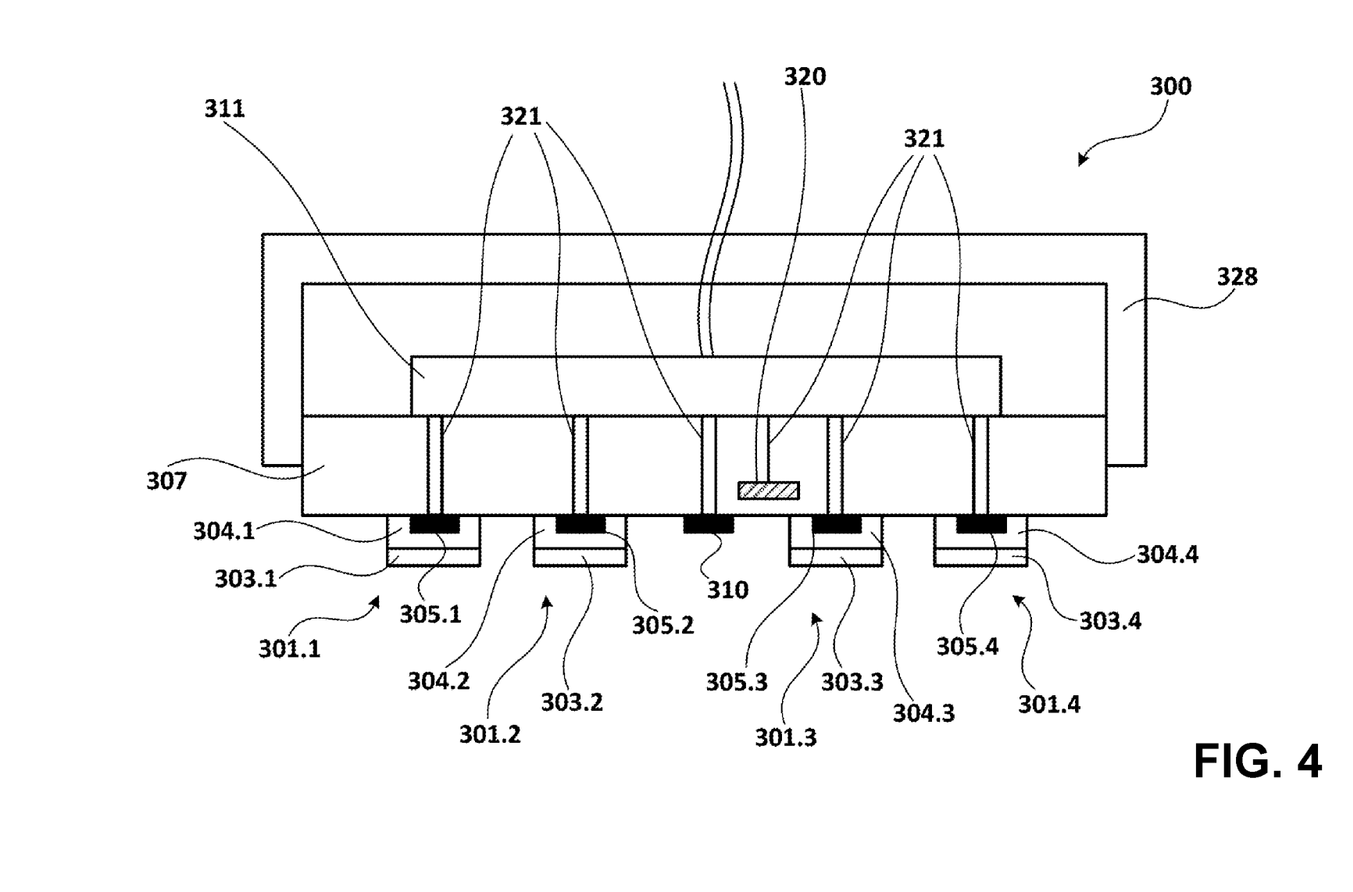
FIG. 4 shows a schematic longitudinal sectional view of a compact measuring arrangement for measuring a pH value.

FIG. 4 schematically shows the design of a measuring arrangement 300 with four glass electrodes 301.1, 301.2, 301.3 and 301.4, each having a pH-sensitive glass membrane. The measuring arrangement 300 is configured to be brought into contact with a measuring fluid, at least in its region comprising the glass electrodes 301.1, 301.2, 301.3 and 301.4, in order to measure the pH value of the measuring fluid. The glass electrodes 301.1, 301.2, 301.3 and 301.4 are arranged on the front side of a carrier 307 made of an insulating ceramic or a circuit board material. They each comprise an electrically conductive lead 305.1, 305.2, 305.3 and 305.4 that is applied to the carrier, a glass membrane 303.1, 303.2, 303.3, 303.4 made of pH-sensitive glass and an intermediate layer 304.1, 304.2, 304.3, 304.4 made of an electron- and/or ion-conducting polymer, e.g., one of the polymers mentioned above, in each case arranged between the lead 305.1, 305.2, 305.3 and 305.4 and the glass membrane 303.1, 303.2, 303.3, 303.4 and electrically conductively connecting the glass membrane 303.1, 303.2, 303.3, 303.4 and the lead 305.1, 305.2, 305.3, 305.4 to each other. The leads 305.1, 305.2, 305.3 and 305.4 may be formed as a metallic layer or conductor tracks on the carrier 307. Arranged between the individual layer stacks forming the glass electrodes 301.1, 301.2, 301.3 and 301.4 are electrically insulating regions of the carrier, so that the individual leads 305.1, 305.2, 305.3 and 305.4 have no electrical contact with each other.

The measuring arrangement 300 also has a reference electrode 310 made of an electrically conductive material, for example a metal or carbon material, that is inert with respect to the measuring fluid. In the exemplary embodiment shown here, the reference electrode 310 is applied as an electrically conductive coating to the carrier 307, and specifically in such a way that it comes into contact with the measuring fluid at the same time as the glass electrodes 301.1, 301.2, 301.3 and 301.4 when the front side of the carrier 307 is brought into contact with the measuring fluid. However, the reference electrode 310 can alternatively be a pin or rod that is optionally connected to the carrier 307 or disconnected from the carrier 307, or a housing part of the housing of the measuring arrangement 300. Moreover, the carrier 307 comprises a temperature sensor 320 which, as shown here, may be embedded in the carrier 307 or, alternatively, may be disposed on the outside of the carrier 307.

A sensor circuit 311 is arranged on the rear side of the carrier 307. It can be electrically conductively connected via feed-throughs 321 in the carrier 307 to the leads 305.1, 305.2, 305.3 and 305.4, the reference electrode 310 and the temperature sensor 320. The sensor circuit 311 can be shielded and sealed with respect to the measuring fluid that contacts the glass electrodes 301.1, 301.2, 301.3, 301.4 by a sensor housing 328 enclosing at least a portion of the carrier 307 and the sensor circuit 311. The sensor circuit 311 is configured to detect a voltage between each of the leads 305.1, 305.2, 305.3, 305.4 and the reference electrode 310, i.e., to detect the electrode potential of each of the glass electrodes 301.1, 301.2, 301.3, 301.4 with respect to the common potential provided by the reference electrode 310. The sensor circuit 311 can generate and output measurement signals representing the detected voltages, for example as measurement voltages. Furthermore, the sensor circuit 311 may generate and output a measurement signal representing the temperature of the measuring fluid. The sensor circuit 311 may itself be designed for further processing of the measurement signals. However, it may also be configured to output the measurement signals or processed measurement signals to a superordinate evaluation circuit for further processing and for determining a pH value of the measuring fluid according to the method described further below. The evaluation circuit may have display means, for example a display, in order to display measured values or other parameters or diagnostic messages. Likewise, the evaluation circuit can have input means or be connectable to input means via which a user can input queries or parameters.

The sensor circuit or the combination of the sensor circuit and the optionally present evaluation circuit form a measuring circuit of the measuring arrangement 300 which serves to generate the measurement signals, to process them and to determine pH measured values from the measurement signals. The measuring circuit may comprise one or more microprocessors and memories, as well as operating programs stored in one or more memories that provide functions of the measuring circuit. For further processing of the measurement signals, for example for calculating measured values and in some cases for carrying out a diagnostic method for determining a state of the measuring arrangement 300, such as a maintenance requirement, the measuring circuit comprises, for example, a computer program used for further processing of the measurement signals and executable by a microprocessor of the measuring circuit.

The pH measurement by means of the measuring arrangement 300 is described in greater detail below. As already described, an electrode potential that is a function of the pH value of the measuring fluid is formed during contact of the measuring fluid with the pH-sensitive glass membranes 303.1, 303.2, 303.3, 303.4 and is detectable by the measuring circuit 311 with respect to the potential of the reference electrode 310.

Figure 5:
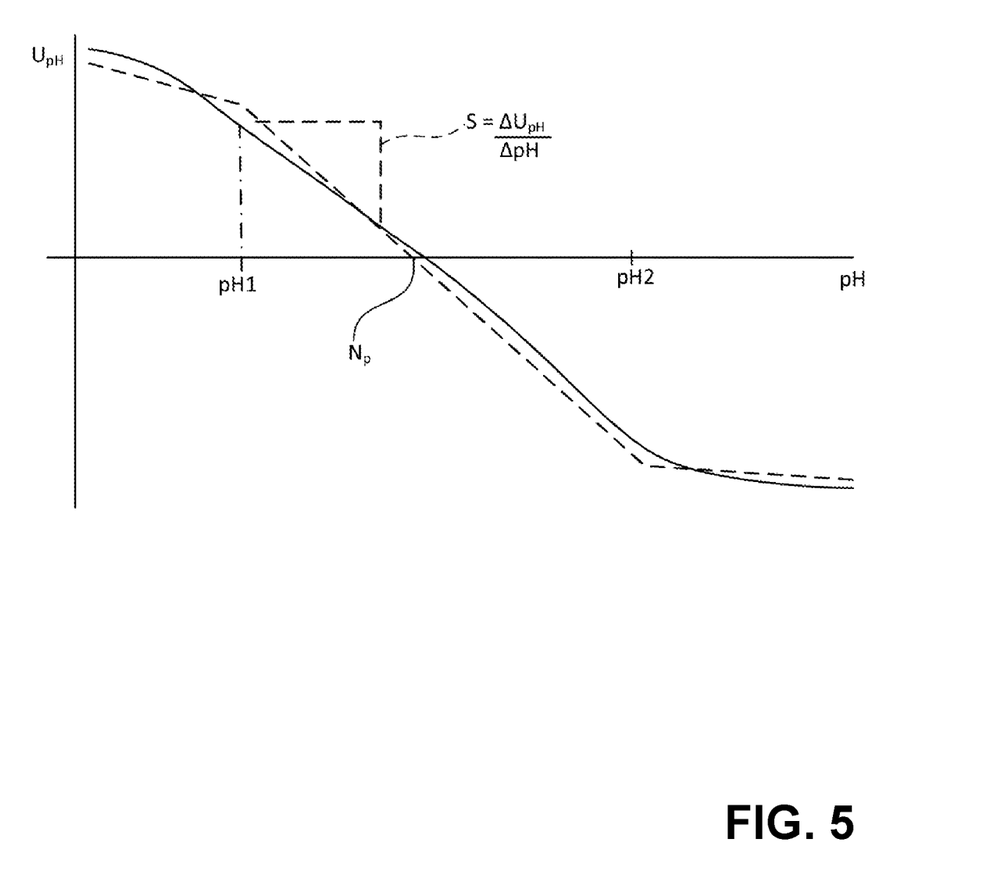
FIG. 5 shows a schematic representation of the typical curve of an electrode potential of a glass electrode as a function of the pH value of a measuring fluid in contact with the glass electrode.

A typical characteristic curve of a glass electrode, i.e., the typical curve of the voltage UpH detectable between a glass electrode and the reference electrode as a function of the pH value, is shown in FIG. 5 (solid line). This voltage is also referred to herein as the electrode potential of the glass electrode. A change in the electrode potential UpH in relation to a change in the pH value causing the former change is referred to as the sensitivity of the glass electrode. The sensitivity of a pH glass electrode is substantially affected by the composition of the pH-sensitive glass membrane. In the glass electrodes 301.1, 301.2, 301.3, 301.4 used in the example according to FIG. 4, the zero crossing of the characteristic curve is affected by the chemical composition and/or the redox state of the electron- and/or ion-conducting intermediate layer 304.1, 304.2, 304.3, 304.4.

Generally speaking, glass electrodes (A) having a first zero point for use in the measuring arrangement described herein may be implemented, for example, as follows. In order to produce the glass electrode, an aqueous dispersion of PEDOT:PSS (3-4 wt. %) with a wet film thickness of 10-15 µm is applied to a pH glass membrane (e.g., Corning 015) which is approximately 300 µm thick. Then, drying is performed at 120° C. for 20 min. Finally, the intermediate layer obtained on the pH glass membrane is contacted with a lead made of glassy carbon. The potential of the resulting glass electrode can be determined potentiometrically with respect to a conventional Ag/AgCl reference electrode.

Glass electrodes (B) having a second zero point different from the first zero point may be designed, for example, as follows. In the production of the glass electrode, an aqueous dispersion of PEDOT:PSS (3-4 wt. %), which is added as an additive to 0.75 wt. % ferrocene carboxylic acid methyl ester (based on the mass of PEDOT:PSS dispersion used) is applied to the glass membrane. The wet film thickness of the applied dispersion can again be 10-15 µm. Then, the film is dried and contacted with a lead made of glassy carbon. A glass electrode having an intermediate layer modified in this way by ferrocene carboxylic acid methyl ester has a zero point shifted by $\Delta E_{B-A} \approx -90$ mV in relation to the non-modified glass electrodes (A) produced according to the previously described method.

The characteristic curve runs approximately linearly in an average pH value range. At least in this partial region between pH1 and pH2, the electrode potential can therefore be described as a function of the pH value with very good approximation by means of a linear function (dashed line) including a zero point Np and a slope $S=\Delta U_{pH}/\Delta pH$ representing the sensitivity of the half-cell. The approximation can often also be acceptable in the edge regions of the pH scale. The zero point Np of this linear function corresponds approximately to the zero crossing of the actual electrode characteristic curve. The slope, like the sensitivity of the glass electrode, is substantially determined by the properties of the pH-sensitive glass membrane, such as by its chemical composition. The slope may also be affected by (artificial) aging of the glass membrane.

The glass membranes 303.1, 303.2 of the first glass electrode 301.1 and of the second glass electrode 301.2 have the same chemical composition and the same aging state in the example described herein. Thus, the slope sp1 of a linear function representing the pH dependence of the electrode potential of the first glass electrode 301.1 is equal to a slope sp2 of a linear function representing the pH dependence of the electrode potential of the second glass electrode 301.2.

The glass membranes 303.3, 303.4 of the third glass electrode 301.3 and the fourth glass electrode 301.4 have the same chemical composition in the example described here, which differs, however, from the chemical composition of the glass membranes 303.1, 303.2 of the first and second glass electrodes 301.1, 301.2. The chemical composition of the glass membranes 303.3, 303.4 of the third and fourth glass electrodes 301.3, 301.4 is selected such that a slope sr1 of a linear function representing the pH dependence of the electrode potential of the third glass electrode 301.3 is reduced compared to the slopes sp1 and sp2 of the first and second glass electrodes 301.1, 301.2. The slope sr1 is equal to a slope sr2 of a linear function representing the pH dependence of the electrode potential of the fourth glass electrode 301.4.

A linear function of conventionally used glass electrodes approximately describing the dependence of the electrode potential at least in a partial region generally has a slope around the theoretical value at room temperature of 59 mv/pH. For example, the glass membranes of the first and second glass electrodes 301.1, 301.2 have a membrane combination of such common glass electrodes in order to achieve a corresponding slope. They can be made, for example, of McInnes glass. pH-sensitive glass membranes having a reduced sensitivity and methods for their production are known from U.S. Pat. No. 4,650,562 and DE 1281183 A1. For example, the third and fourth glass electrodes 301.3, 301.4, to which a lower slope sr1, sr2 is assigned can be realized with these glass membranes.

The intermediate layers 304.1, 304.4 of the first glass electrode 301.1 and the fourth glass electrode 301.4 have the same composition and/or a substantially identical redox state in the present example. Accordingly, the characteristic curve zero point pHp1 assigned to the first glass electrode 301.1 is equal to the zero point pHp2 assigned to the fourth glass electrode 301.4.

The intermediate layers 304.2, 304.3 of the second glass electrode 301.2 and the third glass electrode 301.3 have the same composition and/or a substantially identical redox state in the present example but differ from the composition and/or the redox state of the intermediate layers 304.1, 304.4 of the first glass electrode 301.1 and the fourth glass electrode 301.4. For example, the intermediate layers 304.2, 304.3 of the second glass electrode 301.2 and the third glass electrode 301.3 and the intermediate layers 304.1, 304.4 of the first glass electrode 301.1 and of the fourth glass electrode 301.4 comprise different additives which affect the characteristic curve zero point, such as ionic and/or redox-active additives or additives capable of charge transfer interactions, for example conducting salts, (polymeric) ionic liquids, prussiates, ferrocene derivatives, derivatives of other metallocenes and other transition metal compounds. It is also possible for the intermediate layers 304.2, 304.3 of the second glass electrode 301.2 and the third glass electrode 301.3 or the intermediate layers 304.1, 304.4 of the first glass electrode 301.1 and the fourth glass electrode 301.4 to comprise no additives in addition to the conductive polymer, while the intermediate layers of the respective other two glass electrodes comprise one or more additives.

Accordingly, the second glass electrode 301.2 is assigned a zero point pHr1 of the linear function of the pH value describing its electrode potential in a partial region that corresponds to the zero point pHr2 assigned to the third glass electrode 301.3. The zero points pHr1 and pHr2 differ from the zero points pHp1 and pHp2.

A potential dependent on the composition of the measuring fluid is established on the reference electrode 310. However, the absolute value of the reference potential provided by the reference electrode 310 does not play a role in the measuring arrangement shown here, since, as is shown in more detail below, the electrode potential of all glass electrodes is measured against the common reference electrode 310, and in this way the value of the reference potential is not included in the measured value determination. In a modification of the exemplary embodiment shown here, the reference electrode 310 may also be formed as a conventional second-type reference electrode with junction. A glass electrode which is structurally identical to the remaining glass electrodes 301.1, 301.2, 301.3, 301.4 of the measuring arrangement can also serve as a reference electrode.

The first glass electrode 301.1 and the second glass electrode 301.2 are referred to below as first and second "pH electrodes;" the third glass electrode 301.3 and the fourth glass electrode 301.4 are referred to below as first and second "reference electrodes" in order to better clarify their function in the measuring arrangement 300. However, the electrode potentials of all glass electrodes 301.1, 301.2, 301.3, 301.4 are of course dependent on the pH value of the measuring fluid.

In order to measure the pH value, the glass membranes 303.1, 303.2, 303.3, 303.4 of all glass electrodes 301.1, 301.2, 301.3, 301.4 and the reference electrode 310 of the measuring arrangement 300 simultaneously immerse in the measuring fluid. Between the lead 305.1 of the first pH electrode 301.1 and the reference electrode 310, the sensor circuit 311 detects a first voltage up1 which corresponds to the difference between the electrode potential u1 of the first pH electrode 301.1 and the unknown potential of the reference electrode x. Thus, the following applies to the electrode potential u1:

$$u1 = up1 + x. \qquad (1)$$

Between the lead 305.2 of the second pH electrode 301.2 and the reference electrode 310, the sensor circuit 311 detects a second voltage up2 which corresponds to the difference between the electrode potential u2 of the second pH electrode 301.2 and the reference potential x. The following applies to the electrode potential u2:

$$u2 = up2 + x. \qquad (2)$$

Between the lead 305.3 of the first reference electrode 301.3 and the reference electrode 310, the sensor circuit 311 detects a third voltage ur1 which corresponds to the difference between the electrode potential u3 of the first reference electrode 301.3 and the reference potential x. The following applies to the half-cell potential u3:

$$u3 = ur1 + x. \qquad (3)$$

Between the lead 305.4 of the second reference electrode 301.4 and the reference electrode 310, the sensor circuit 311 detects a fourth voltage ur2 which corresponds to the difference between the electrode potential u4 of the second reference half-cell 301.4 and the reference potential x. The following applies to the half-cell potential u4:

$$u4 = ur2 + x. \quad (4)$$

Furthermore, under the aforementioned approximation of the pH dependence of the electrode potentials of the electrodes 301.1, 301.2, 301.3, 301.4 by a linear function of the pH value (pH), the following applies to the electrode potentials u1 to u4:

$$u1 = sp1(pHp1 - pH), \quad (5)$$

$$u2 = sp2(pHp2 - pH), \quad (6)$$

$$u3 = sr1(pHr1 - pH), \quad (7)$$

$$u4 = sr2(pHr2 - pH). \quad (8)$$

Under the assumption that the slopes sp1, sp2 assigned to the pH electrodes 301.1, 301.2 are equal and also age to the same degree in the measuring mode under the same conditions due to aging phenomena, a current value of the slopes sp1, sp2 assigned to the pH electrodes 301.1, 301.2 can be determined and provides the basis of the current measured value determination:

$$sp1 = \frac{up1 - up2}{pHp1 - pHp2}, \quad (9)$$

Likewise, a current value of the slopes sr1, sr2 assigned to the reference electrodes 301.3, 301.4, can be determined in a corresponding way.

$$sr1 = \frac{ur1 - ur2}{pHr1 - pHr2}. \quad (10)$$

A difference in the voltages u1-u3, u1-u4, u2-u3 and u2-u4 can be used to determine the current pH measured value. This corresponds to a referencing of each one of the pH electrodes 301.1, 301.2 to each one of the reference electrodes 301.3, 301.4. The unknown potential x of the reference electrode 310 is eliminated by forming the difference. In the following equation (11), the difference between u1 and u3 (equations (1), (3), (5), (7)) is used randomly:

$$-pH\, sr1 + pH\, r1\, sr1 - ur1 = -pH\, sp1 + pHp1\, sp1 - up1. \quad (11)$$

By inserting the expressions given in equations (9) and (10) for the slopes sp1, sr1 into equation (11), the following results as the pH value of the measuring fluid 15:

$$pH = \frac{pHp1(pHr2(-up2 + ur1) + pHr1(up2 - ur2)) +}{pHr2(up1 - up2) + pHr1(-up1 + up2) +} \quad (12)$$
$$\frac{pHp2(pHr2(up1 - ur1) + pHr1(-up1 + ur2))}{(pHp1 - pHp2)(ur1 - ur2)}.$$

Based on the above equation, the measuring circuit determines the current pH measured value and displays it or outputs it to a superordinate unit, e.g. a memory-programmable process control or an operating device connectable by radio to the evaluation circuit. In the determination of the pH measured value, the measuring circuit can additionally carry out a temperature compensation based on a currently detected temperature measurement signal of the temperature sensor 320.

By the simultaneous determination of the current slopes sr1, sp1 with the measured value determination, the measuring arrangement 300 is able to independently compensate for measurement errors which occur as a result of aging-related changes in the slopes. For this purpose, the slopes sr1, sp1 of course do not necessarily have to be calculated individually in a separate computing step. Rather, the corresponding variables used for the determination of the slopes according to equations (9) and (10) can go directly into the calculation of the pH value according to equation (12). By referencing a first glass electrode (pH electrode) to which a first slope is assigned against a further glass electrode (reference electrode) to which a second slope is assigned that is different from the first slope, it is possible to dispense with a conventional reference electrode with junction.

The measuring arrangement 300 can also be used to measure the redox potential of the measuring fluid in addition to its pH value. Based on the determined pH measured value, the electrode potential of one of the glass electrodes 301.1, 301.2, 301.3, 301.4 can be determined from one of the equations (5)-(8), and the reference potential x can be calculated from the measured voltage between the lead of this glass electrode and the reference electrode 310. The redox potential of the measuring fluid can be derived from the reference potential.

In a variation of the exemplary embodiment described herein, it is possible to provide only three glass electrodes having a pH-sensitive membrane. In this case, two of the three glass electrodes can have identically designed pH-sensitive membranes but, with regard to their composition and/or their redox states, different intermediate layers between the membranes and the respective leads, so that the electrode potential of the two electrodes can be described as a function of the pH value of a measuring fluid contacting the membranes, at least in a partial region, as a linear function having a slope identical for both membranes but different zero points. The third glass electrode has a pH sensitive glass membrane with a different composition from that of the glass membranes of the other two glass electrodes. The third glass electrode has an intermediate layer between its glass membrane and its lead, where the intermediate layer has the same composition and/or a substantially identical redox state as the intermediate layer of the first or the second glass electrode. A linear function describing the dependence of the electrode potential of the third glass electrode at least in a partial region of the pH scale thus has a slope different from the slope assignable to the first two glass electrodes. The zero point of this function is identical to one of the zero points of the other two glass electrodes but different from the zero point of the remaining glass electrode. With this measuring arrangement, a sufficiently specific equation system, which permits the determination of a current value of the slope of the first two glass electrodes together with the measured value determination, can be set up in a manner analogous to what was previously demonstrated in reference to the exemplary embodiment shown in FIG. 1. Thus, the slope assigned to the third glass electrode cannot be determined at present. However, if a conventional membrane glass which leads to a slope in the range of the theoretical value of 59 mv/pH is chosen as the membrane glass of the third glass electrode, a regular determination of the slope is not absolutely necessary. Rather, in this embodiment, a sufficiently accurate measured value determination can be ensured over longer periods of time, where applicable by means of a calibration carried out from time to time.

The time curve of the slope values sr1, sp1 determined at the same time as the measured value determination according to equations (9) and (10), for example, can be evaluated for diagnostic purposes. This can be carried out, for example, by the evaluation circuit or by the sensor circuit. For example, one or more threshold values that specify a warning or alarm threshold may be stored in a memory of the evaluation circuit. If one of the slope values falls below a predetermined threshold value, the evaluation circuit can output a warning message which indicates to a user that the measuring arrangement has to be calibrated or replaced. By extrapolation of a time curve of the slope values, it is also possible to predict a time span during which a slope falls below the predefined threshold value. A time point in the future at which a calibration or replacement of the measuring device or at least one of the half-cells is required can be derived from this prediction and output by the evaluation circuit.

An estimate of the achieved measuring accuracy can be performed on the basis of equation (12). This estimate can be output by the evaluation circuit in addition to the current measured value.

Further modifications of the measuring arrangement 300 are conceivable. For example, the individual glass electrodes 301.1, 301.2, 301.3, 301.4 can be designed to be exchangeable. To this end, the glass electrodes 301.1, 301.2, 301.3, 301.4 can each be designed to be unsupported or to be on a separate electrode carrier made of an insulating material and designed as a disk or wafer. The leads 305.1, 305.2, 305.3, 305.4 in this design are connected either via a feed-through of the respective electrode carrier or, in the case of an unsupported configuration, directly via a contacting point of the lead 305.1, 305.2, 305.3, 305.4 to a pin or plug element that can be connected to a corresponding contact point, such as a feed-through 321 of the carrier 307 of the measuring arrangement 300, in such a way that it can be plugged in or unplugged again. In this embodiment, it is possible to replace individual glass electrodes. This is beneficial if the typical service life of the glass electrodes with membrane glass having a reduced sensitivity is significantly shorter than that of the glass electrodes with conventional membrane glass.

The invention claimed is:

1. A glass electrode including:
   an analyte-sensitive glass membrane;
   an electrically conductive lead; and
   an intermediate layer which conductively connects the lead and the glass membrane to one another;
   wherein the intermediate layer is made of an electron- and/or ion-conducting polymer, and wherein the lead is made of an electrically conductive, non-metallic material.

2. The glass electrode of claim 1, wherein the intermediate layer is positioned between the lead and the glass membrane.

3. The glass electrode of claim 1, wherein the wherein the electron- and/or ion-conducting polymer is a doped, intrinsically conductive polymer.

4. The glass electrode of claim 1, wherein the intermediate layer contains ionic and/or redox-active additives and/or additives capable of charge transfer interactions.

5. The glass electrode of claim 1, wherein the lead is made of an electron- and/or ion-conducting polymer, an electrically conductive ceramic or an electrically conductive carbon-based material.

6. The glass electrode of claim 1, wherein at least a part of the lead is formed from carbon fibers.

7. The glass electrode of claim 6, wherein the carbon fibres are in the form of a carbon thread or a carbon textile.

8. The glass electrode of claim 1, further including a housing containing an interior space sealed by the glass membrane, and wherein the intermediate layer and the lead are disposed in the interior space.

9. The glass electrode of claim 1, wherein the lead is electrically contacted by an electrical conductor that can be or is electrically conductively connected to a measuring circuit.

10. A potentiometric sensor including:
    a glass electrode comprising an analyte-sensitive glass membrane, an electrically conductive lead, and an intermediate layer which conductively connects the lead and the glass membrane to one another, wherein the intermediate layer is made of an electron- and/or ion-conducting polymer, and wherein the lead is made of an electron- and/or ion-conducting polymer, an electrically conductive ceramic or an electrically conductive carbon-based material; and
    a reference electrode and a measuring circuit electrically conductively connected to the glass electrode and the reference electrode and configured to detect a voltage between the glass electrode and the reference electrode and to generate a measurement signal representing the detected voltage.

11. The potentiometric sensor of claim 10, wherein the reference electrode includes a polymer membrane configured for contact with a measuring fluid and impregnated with an ion exchanger and/or a conducting salt, an electrically conductive lead, and an intermediate layer made of an electron- and/or ion-conducting polymer that electrically conductively connects the lead and the polymer membrane to each other.

12. The potentiometric sensor of claim 10, wherein the measuring circuit is configured to be shifted into a regeneration mode, and to polarize the glass electrode during the regeneration mode.

13. The potentiometric sensor of claim 10, wherein at least a part of the lead is formed from carbon fibers.

14. The potentiometric sensor of claim 13, wherein the carbon fibres are in the form of a carbon thread or a carbon textile.

15. A measuring arrangement including:
    at least a first, a second and a third glass electrode;
    wherein each of the first, the second, and the third electrode includes an analyte-sensitive glass membrane, an electrically conductive lead, and an intermediate layer which conductively connects the lead and the glass membrane to one another, wherein the intermediate layer is made of an electron- and/or ion-conducting polymer and wherein the lead is made of an electrically conductive, non-metallic material; and
    a measuring circuit configured to detect an electrode potential of each of the first, second, and third glass electrodes in reference to a common reference potential;
    wherein the electrode potential of each of the first, second, and third glass electrodes is dependent on a pH value of a measuring fluid contacting the glass membrane of each of the first, second, and third glass electrodes, such that each of the first, second, and third glass electrodes has a respective sensitivity, wherein the sensitivity of each of the first, second, and third glass electrodes in each case corresponds to a change in its electrode potential in relation to a change in the pH value of the measuring fluid that causes the former change;

wherein the sensitivity of the first glass electrode is different from the sensitivity of the third glass electrode;

wherein the electrode potential of the first glass electrode as a function of the pH value of the measuring fluid has a first zero point;

wherein the electrode potential of the second glass electrode as a function of the pH value of the measuring fluid has a second zero point;

wherein the electrode potential of the third glass electrode as a function of the pH value of the measuring fluid has a third zero point; and wherein the first zero point differs from the second zero point.

16. The measuring arrangement of claim 15, wherein the sensitivity of the first glass electrode is equal to the sensitivity of the second glass electrode.

17. The measuring arrangement of claim 15, further including:

at least a fourth glass electrode;

wherein the electrode potential of the fourth glass electrode depends on the pH value of the measuring fluid contacting the pH-sensitive glass membrane of the fourth glass electrode;

wherein the measuring circuit is configured to detect the electrode potential of the fourth glass electrode in reference to the common reference potential;

wherein the fourth glass electrode has a sensitivity which corresponds to a change of its electrode potential in relation to a change in the pH value of the measuring fluid causing the former change; and wherein the sensitivity of the fourth glass electrode equals the sensitivity of the third glass electrode.

18. The measuring arrangement of claim 17, wherein the electrode potential of the fourth glass electrode as a function of the pH value of the measuring fluid has a fourth zero point that is different from the second zero point.

19. The measuring arrangement of claim 15, further including a reference electrode which is connected conductively to the measuring circuit and is intended for contact with the measuring fluid and which provides the common reference potential.

20. The measuring arrangement of claim 15, wherein the measuring circuit is configured to detect potential differences between the respective electrode potentials and the common reference potential and to determine, based on the detected potential differences, the pH value of the measuring fluid in contact with the glass electrodes.

21. The measuring arrangement according to claim 15, wherein the lead is made of an electron- and/or ion-conducting polymer, an electrically conductive ceramic or an electrically conductive carbon-based material.

22. The measuring arrangement according to claim 15, wherein at least a part of the lead is formed from carbon fibers.

23. A method for manufacturing a glass electrode, the glass electrode including an analyte-sensitive glass membrane, an electrically conductive lead made of an electrically conductive, non-metallic material, and an intermediate layer which conductively connects the lead and the glass membrane to one another, wherein the intermediate layer is made of an electron- and/or ion-conducting polymer, the method including steps of:

applying a layer of an electron- and/or ion-conducting polymer or an electrically conductive ceramic to an analyte-sensitive glass membrane; and connecting the lead made of the electrically conductive, non-metallic material to the side of the applied layer facing away from the glass membrane, so that the layer forms an intermediate layer that electrically conductively connects the glass membrane and the lead to each other.

24. The method according to claim 23, wherein at least a part of lead is formed from carbon fibers.

25. A method for operating a sensor or a measuring arrangement having at least one glass electrode, the glass electrode including an analyte-sensitive glass membrane, an electrically conductive lead, and an intermediate layer which conductively connects the lead and the glass membrane to one another, wherein the intermediate layer is made of an electron- and/or ion-conducting polymer, the method including steps of:

contacting the at least one glass electrode and a reference electrode of the sensor or the measuring arrangement with a measuring fluid;

repeatedly detecting a measurement voltage between the at least one glass electrode and a reference electrode of the sensor in a measuring mode of the sensor or the measuring arrangement;

shifting a measuring circuit of the sensor or the measuring arrangement from the measuring mode into a regeneration mode; and applying a voltage between a lead of the at least one glass electrode and a counter electrode during the regeneration mode, wherein the counter electrode is arranged on a side of a glass membrane of the at least one glass electrode that faces away from the lead.

26. The method according to claim 25, further including:

during the measuring mode, registering measurement voltages detected within a time period and/or charges or current intensities flowing in the time period between the at least one glass electrode and the reference electrode;

determine a load on the glass electrode on the basis of the registered measurement voltages, charges or current intensities; and based on the determined load, determining a time point at which the measuring circuit is to be put into the regeneration mode and/or, based on the determined load, determining a voltage to be applied during the regeneration mode and/or a time period in which the voltage is to be applied between the lead and the counter electrode in the regeneration mode.

27. A potentiometric sensor including:

a glass electrode comprising an analyte-sensitive glass membrane, an electrically conductive lead, and an intermediate layer which conductively connects the lead and the glass membrane to one another, wherein the intermediate layer is made of an electron- and/or ion-conducting polymer; and a reference electrode and a measuring circuit electrically conductively connected to the glass electrode and the reference electrode and configured to detect a voltage between the glass electrode and the reference electrode and to generate a measurement signal representing the detected voltage, and wherein the measuring circuit is configured to be shifted into a regeneration mode, and to polarize the glass electrode during the regeneration mode.

* * * * *